Aug. 12, 1941. W. KULIKOFF 2,252,660
HYDRAULIC DEVICE FOR STABILIZING AND STEERING PURPOSES
Filed Jan. 27, 1939 2 Sheets-Sheet 1
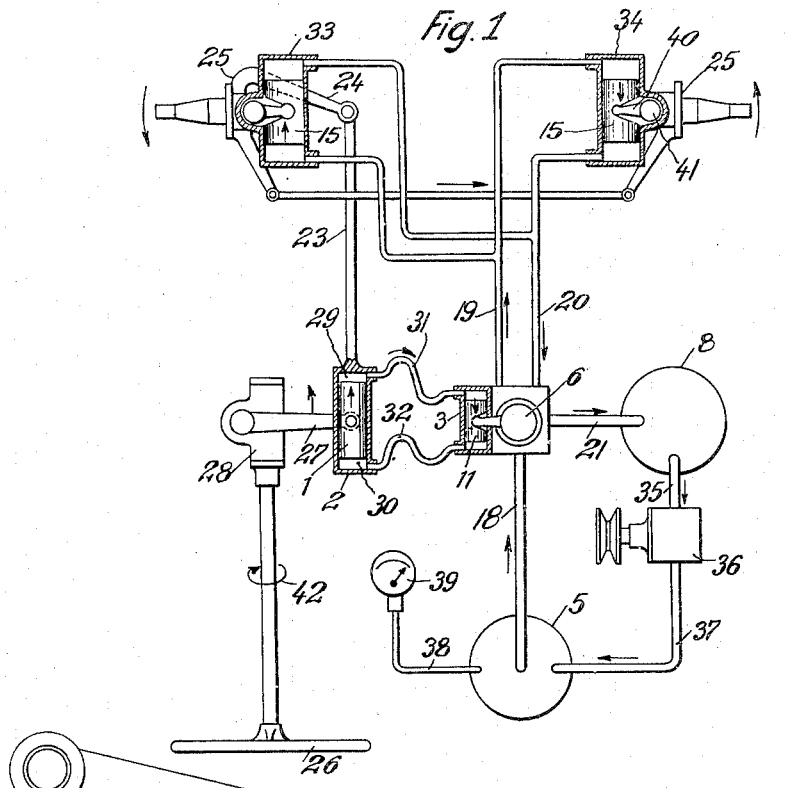
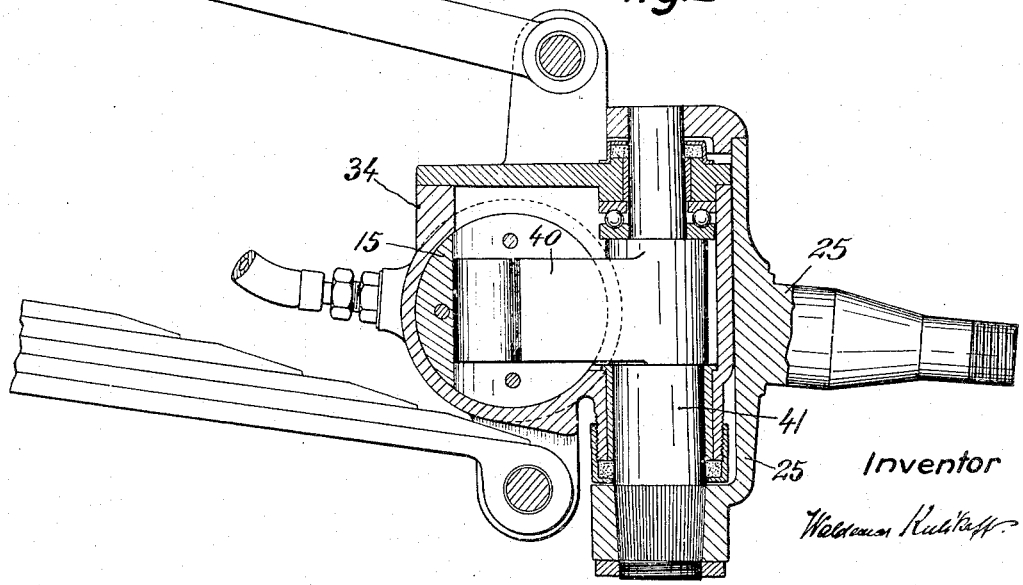
Inventor
Waldemar Kulikoff Patented Aug. 12, 1941

2,252,660

UNITED STATES PATENT OFFICE 2,252,660

HYDRAULIC DEVICE FOR STABILIZING AND STEERING PURPOSES

Waldemar Kulikoff, Berlin-Grunewald, Germany

Application January 27, 1939, Serial No. 253,161
In Germany February 5, 1938

1 Claim. (Cl. 180—792)

This invention relates to a hydraulic device for stabilizing and steering purposes, for example, for the steering of road wheels of motor vehicles.

Auxiliary power devices for hydraulically steering the road wheels of a vehicle are known. Such auxiliary power steering devices are provided with a valve actuated by the steering wheel. This valve controls the admission of a pressure medium to the operating piston movably arranged in a cylinder forming part of a hydraulic circuit. By way of a steering linkage the pistons act upon the stub axles or swivels of the vehicle.

The known steering devices of this kind have the disadvantage that the steering is mechanically effected by use of more or less complicated devices. The steering devices are extremely sensitive to wear. The reliability of the known hydraulic steering arrangements is, therefore, unsatisfactory.

The present invention relates to a hydraulic auxiliary steering device for motor-cars which is free of all the disadvantages of the known devices of this kind. Moreover, with regard to the latter the device according to the invention has the advantage that complicated mechanical controls are unnecessary, that the steering linkage is completely relieved of load and that during drive the wheels to be steered are locked in the adjusted position thus preventing that shocks due to obstructions on the roadway are transferred to the steering wheel.

The device according to the invention directly acts upon the road wheels of the vehicle to be steered, thereby relieving the steering linkage. The hydraulic operating system is hydraulically controlled without the assistance of a mechanical control.

In the accompanying drawings the invention is shown by way of example.

In these drawings:

Fig. 1 is a diagrammatic view of an auxiliary power steering arrangement according to the invention, Fig. 2 shows a section through one of the operating pistons.

Figure 3:
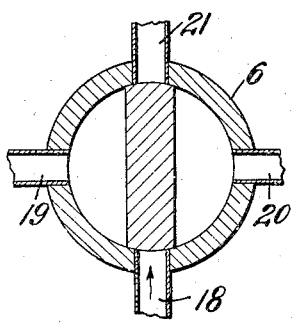
Figs. 3, 4, 5, 6, 7, 8 and 9 show details of some constructions and various operative positions of the control valve.

In the construction of the auxiliary steering arrangement according to the invention shown in Fig. 1, the steering wheel 26 is by way of a steering gear 28 and a steering arm 27 connected to a piston 1 reciprocatably arranged in a movable cylinder 2. The latter is rigidly connected to the connecting rod 23 of the steering mechanism. The rod 23 is pivoted to the lever 24 of the stub axle or swivel 25. The lever 24 in turn is rigidly connected to the stub axle or swivel 25 of the motor-car. The upper and lower chambers 29 and 30 respectively of the cylinder 2 are connected to the pressure chambers of a control cylinder 3 by means of pipes 31 and 32 respectively. Movably arranged in the cylinder 3 is a control piston 11 which in turn is pivoted to the control valve 6. The cylinder 2, the pipes 31, 32 and the cylinder 3 together form the primary hydraulic circuit.

The control valve 6, for instance the rotary valve, shown in detail in Figs. 3–9 is, as may be seen from Fig. 1, connected to the operating cylinders 33 and 34 by pipes 19 and 20. In each of the cylinders 33 and 34 a piston 15 is movably arranged which is connected to a lever 40. The latter is rigidly connected to a rotatable bolt 41 which in turn is rigidly connected to the stub axle or swivel 25, the arrangement being such that the stub axle or swivel is adjusted by the movements of the piston 15 (see Figs. 1 and 2). A pipe 21 connects the control valve 6 to a collecting vessel 8 which by way of a pipe 35 is connected to a feed pump 36. By way of a pipe 37 the pump 36 forces the liquid into the closed vessel 5. The vessel 8 is open to the atmosphere. By way of a pipe 38 the vessel 5, containing liquid under pressure, is connected to a pressure gauge or manometer 39.

The control valve 6 may close the pipes 19 and 20 or admit the flow of pressure liquid to the operating chambers of the cylinders 33 and 34.

In Fig. 3 the control valve, formed as a rotary valve, is shown in a position in which all passages of the valve are closed.

Figure 4:
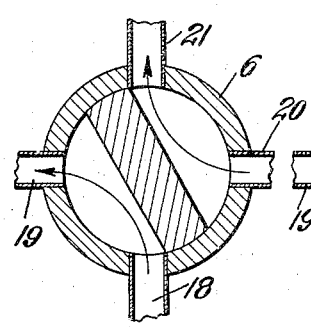

Fig. 4 illustrates a position of the control valve in which the passages are fully opened so that the pressure liquid, flowing through the pipe 18, may reach the pipe 19 and serve to hydraulically operate the steering.

Figure 5:
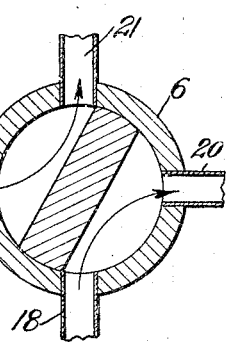

Fig. 5 also shows the valve with fully opened passages, in this case, however, in a reversed direction as illustrated in Fig. 4. The pressure liquid flows from the pipe 18 into the pipe 20 and in this case also serves to hydraulically operate the steering.

Figure 6:
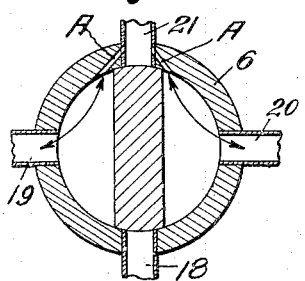
Figure 7:
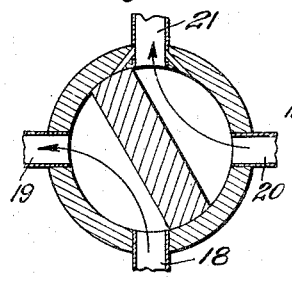
Figure 8:
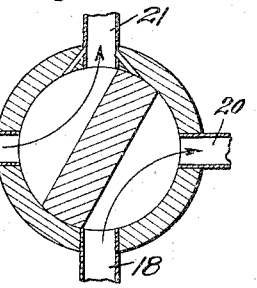

The valves shown in Figs. 6, 7, and 8 correspond to those illustrated in Figs. 3, 4, and 5, respectively, and show the action of a control valve having overflow passages A.

Fig. 6 shows the pipe 18 closed, whereas the pipes 19, 21 and 20 are connected to each other by the passages A so that the pistons are not locked but only checked. The resistance opposed to the movement of the piston is dependent on the larger or smaller cross-section of the passages A. The locking of the wheels in this case, therefore, is not complete so that an elastic steering is warranted.

Figs. 7 and 8 show the operating positions which the control valve occupies during the hydraulic operation of the steering.

Figure 9:
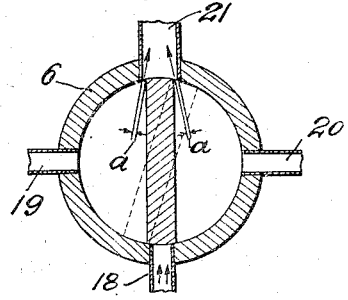

Fig. 9 illustrates a control valve similar to that shown in Figs. 6, 7 and 8. The passages A, however, are replaced in this case by slots *a* provided between the movable member of the control valve and the return pipe 21.

The operation of the device according to the invention is about as follows:

If the steering wheel 26 is turned in the direction of the arrow 42 by the driver of the motorcar, the piston 1 of the impulse cylinder 2 is moved by the steering arm 27. The pressure differences produced hereby in the control cylinder 3 move the piston 11 and thereby the control valve 6 in such a manner that the pipes 18 and 20 are connected to the pipes 19 and 21 respectively. The movement of the individual elements and the direction of flow of the pressure liquid are indicated in the drawings by arrows. Each of the operating pistons 15 movably arranged in the operating cylinders will be connected to the vessel 5 containing the liquid under pressure and, therefore, actuate the stub axles or swivels 25 in the desired direction as long as the steering wheel 26 is turned by the driver. Hereby the lever 24 and the rod 23 connected thereto is moved which latter is rigidly connected to the movable impulse cylinder 2. The position of the piston 1 relatively to the cylinder 2, therefore, is not changed as long as the driver turns the steering wheel. As soon as the steering hand wheel 26 ceases to turn, the piston 1 remains stationary while its cylinder 2 carries out a small subsequent displacement whereby the piston 1 will attain its middle position in the cylinder and the two hydraulic circuits will again reach their position of rest in which the wheels to be steered are locked.

The device described above and shown in the drawings also serves to absorb any shocks which otherwise would act upon the wheels to be steered and which may be produced in the case of the turning of the vehicle, for example by an obstruction on the roadway or owing to tire troubles, as such shocks will effect movement of the cylinder 2. The shock thus cannot snatch or wrest the steering wheel out of the driver's hand.

The auxiliary steering mechanism according to the invention may be used with other known types of wheel suspension.

What I claim is:

A hydraulic device for steering the road wheels of road vehicles comprising the subcombination of: a first hydraulic circuit; a movable cylinder; a movable piston in said cylinder; means for moving said piston; and a movable control member, said cylinder, piston and control member being included in said first circuit; a second hydraulic circuit operatively associated with said first circuit; a fluid supply container; a valve device adapted to control the flow of fluid in said second circuit, said device being operatively connected to said control member in said first circuit and a main operating piston for connection to a stub axle of the vehicle road wheels, said container, valve device and piston being included in said second circuit, the arrangement being such that, on actuation of said piston in said first circuit, said control member is moved positively to actuate said valve device to allow fluid in said second circuit to flow in said circuit and actuate said main operating piston in said second circuit; and link mechanism positively connecting said last-mentioned piston to said movable cylinder in said first circuit for the purpose of causing said piston in said cylinder to return to its initial neutral position, on said moving means ceasing to operate, and closing said second circuit substantially as described.

WALDEMAR KULIKOFF.